US009122610B2

(12) United States Patent
Jungwirth et al.

(10) Patent No.: US 9,122,610 B2
(45) Date of Patent: Sep. 1, 2015

(54) OS FRIENDLY MICROPROCESSOR ARCHITECTURE

(71) Applicant: The United States of America as Represented by the Secretary of the Army, Washington, DC (US)

(72) Inventors: Patrick Jungwirth, New Market, AL (US); Patrick La Fratta, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 242 days.

(21) Appl. No.: 14/029,053

(22) Filed: Sep. 17, 2013

(65) Prior Publication Data
US 2014/0082298 A1    Mar. 20, 2014

Related U.S. Application Data

(60) Provisional application No. 61/701,915, filed on Sep. 17, 2012.

(51) Int. Cl.
*G06F 12/08*    (2006.01)
*G06F 9/38*    (2006.01)

(52) U.S. Cl.
CPC ............. *G06F 12/0846* (2013.01); *G06F 9/38* (2013.01); *G06F 12/0855* (2013.01); *G06F 12/0875* (2013.01); *Y02B 60/1225* (2013.01)

(58) Field of Classification Search
CPC ....... G06F 9/38; G06F 9/3867; G06F 9/3869; G06F 12/0805; G06F 12/0872; G06F 2015/765; G06F 2212/1016; G06F 2212/27; G06F 2212/45
See application file for complete search history.

(56) References Cited

U.S. PATENT DOCUMENTS

2006/0294344 A1*  12/2006  Hsu et al. ................ 712/228

OTHER PUBLICATIONS

T. Mudge, "Power: a First-Class Architectural Design Constraint," Computer, vol. 34, No. 4, pp. 52-58, Apr. 2001.
S. Vangal, et. al., "5-GHz 32-Bit Integer Execution Core in 130-nm dual-VT CMOS," Solid-State Circuits, IEEE Journal of, vol. 37, No. 11, pp. 1421-1432, Nov. 2002.
C. Chow, "Dynamic Voltage Scaling for Commercial FPGAs," Proceedings of the IEEE International Conference on Field-Programmable Technology, pp. 173-180, Dec. 11-14, 2005.
N. Muralimanohar, et al., "Architecting Efficient Interconnects for Large Caches with CACTI 6.0," IEEE Micro, vol. 28, No. 1, pp. 69-79, Jan.-Feb. 2008.
"File System Permissions", http://en.wikipedia.org/wiki/File_permissions , Aug. 4, 2011.

* cited by examiner

*Primary Examiner* — Hal Schnee
(74) *Attorney, Agent, or Firm* — Michael K. Gray

(57) ABSTRACT

The present invention is a microprocessor architecture for efficiently running an operating system. The improved architecture provides higher performance, improved operating system efficiency, enhanced security, and reduced power consumption.

7 Claims, 13 Drawing Sheets

OS FRIENDLY MICROPROCESSOR ARCHITECTURE

DEDICATORY CLAUSE

The invention described herein may be manufactured, used and licensed by or for the US Government for governmental purposes without the payment of any royalties.

BACKGROUND OF THE INVENTION

Prior Art processors and microprocessors have not tried to balance hardware performance and OS performance at the same time. By taking into consideration the costs and benefits of implementing functions in hardware and in the operating system at the same time, this leads to optimizations resulting in a higher performance operating system, and low power requirements. The cost is a modest increase in hardware complexity.

SUMMARY OF THE INVENTION

The present microprocessor architecture 100 invention parallelizes the operations typically used in software by an operating system to significantly improve the performance of an operating system context switch. A second benefit of the new architecture is hardware based information assurance.

FIG. 1 introduces the Operating System Friendly Microprocessor Architecture 100. The processor memory and bus architecture is an extended Harvard architecture. A Harvard architecture uses separate busses and memory banks for program instructions and data. The architecture consists of 4 DMA/cache controller banks connected to a microprocessor pipeline 190. The OS Friendly Architecture 100 is essentially a switched set of cache memory banks in a pipeline configuration. The pipeline DMA/Cache Banks and Controllers in FIG. 1 100 provide higher performance and lower power requirements through pipelining and parallelism.

OS information assurance for data is implemented in hardware. By extending the traditional Unix® file permissions bits down to each register, each memory cache bank and each cache memory bank address, the processor 100 provides hardware level information assurance.

Information assurance is provided for OS library function calls by extending the principal of least privilege. A table 700, listing all possible library function calls the application software may use, is created. Each library function call lists a set of limits. Exceeding the limits either requires higher than user access or raises an exception.

The OS Friendly Architecture 100 (1) significantly reduces the cost of an operating system context switch (1 to 10 CPU cycles is possible); (2) provides hardware level information assurance; and (3) reduces processor power requirements.

DETAILED DESCRIPTION

Figure 1:
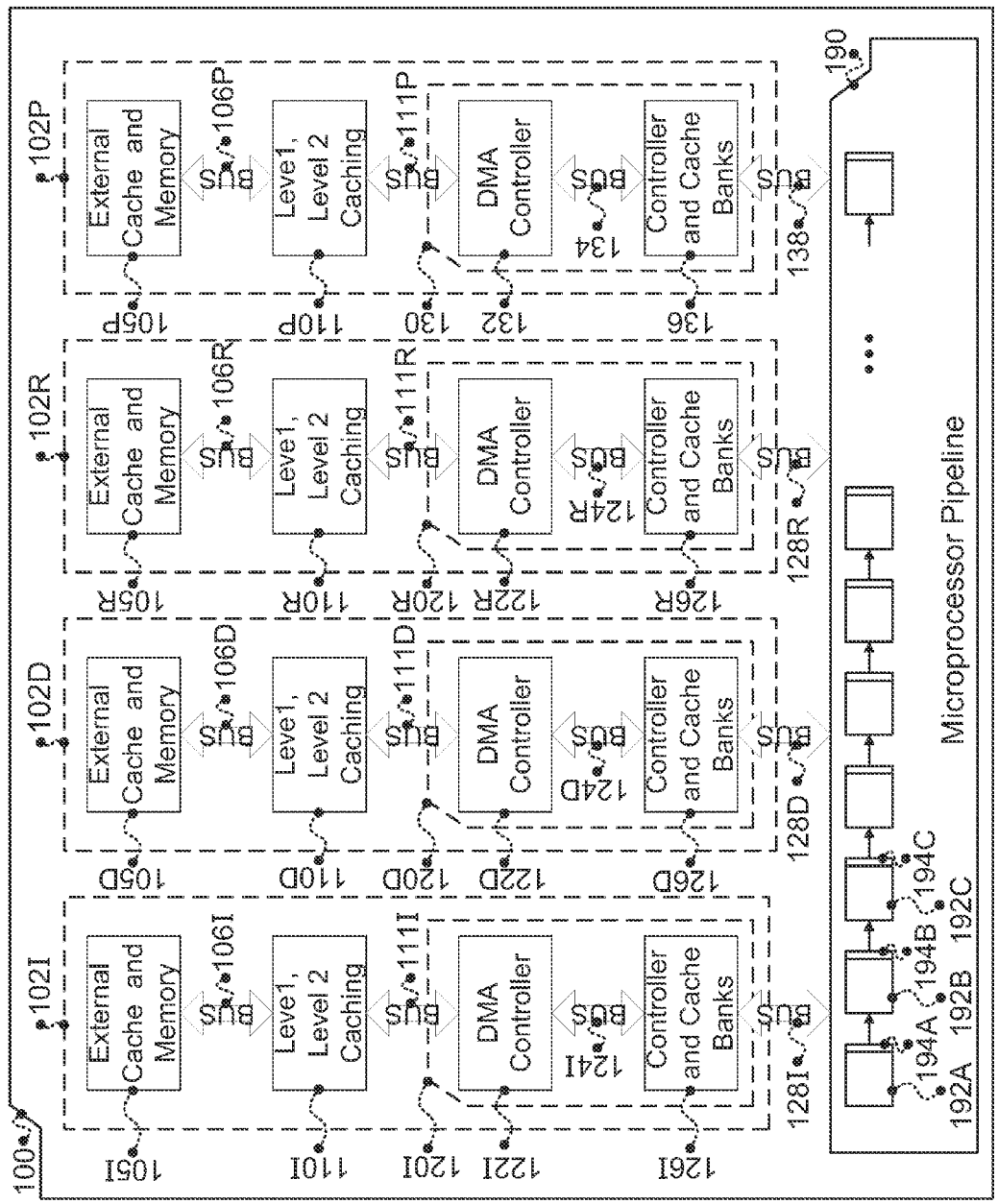
FIG. 1.—OS Friendly Processor Architecture
FIG. 2.—Data, Instruction, and Register Cache Bank Controllers and Cache Banks
FIG. 3.—Pipeline State Cache Bank Controllers and Cache Banks
FIG. 4A.—Data, Instruction, and Register Cache Banks
FIG. 4B.—Pipeline State Cache Banks
FIG. 5.—Context Switch Timing Diagram
FIG. 6.—Cache Bank and Memory Cell Hardware Information Assurance
FIG. 7.—Library Function Call Table
FIG. 8.—Conventional Processor Architecture Model
FIG. 9.—OS Friendly Processor Architecture Model
FIG. 10.—Component-level Timing Diagram for Conventional Architecture
FIG. 11.—Time-Optimized OS Friendly Architecture Timing Diagram
FIG. 12.—OS Friendly Architecture Zero Overhead Thread Context Switch Timing Diagram

FIG. 1 introduces the Operating System Friendly Microprocessor Architecture 100. The processor memory and bus architecture 100 is an extended Harvard architecture. The architecture consists of 4 DMA/cache controller banks 120I, 120D, 120R, and 130, (where I=instruction, D=data, and R=register), connected to a microprocessor pipeline 190. The OS Friendly Architecture 100 is essentially a switched set of cache memory banks 250I, 250D, 250R, and 350 in a multiple pipeline configuration. (FIG. 2 and FIG. 3) The DMA/Cache Controller Banks 120I, 120D, 120R, and 130 connect to internal level 1/level 2, etc. caching through busses 111I, 111D, 111R, and 111P, where P=pipeline. The DMA/Cache Controller Banks 120I, 120D, 120R, and 130), connect to execution pipeline 190 through busses 128I, 128D, 128R, and 138. Level 1/Level 2 caching 110I, 110D, 110R, and 110P connect to external cache and external memory 105I, 105D, 105R, and 105P through busses 106I, 106D, 106R, and 106P. The OS Friendly Architecture 100 can also be modified to use a unified external memory architecture similar to a modified Harvard architecture (internal separate caches for instructions and data, and a unified external memory).

A program instruction memory module 102I has a first external cache and memory module 105I, a first internal cache 110I, a first DMA controller 122I, and a first cache controller and cache bank module 126I (FIG. 1). The first external cache and memory module 105I connects to the first internal cache 110I with the first internal cache 110I connecting to first DMA controller 122I. First DMA controller 122I connects to the first cache controller and cache bank module 126I.

A data memory module 102D has a second external cache and memory module 105D, a second internal cache 110D, a second DMA controller 122D, and a second cache controller and cache bank module 126D. The second external cache and memory module 105D connects to the second internal cache 110D. The second internal cache 110D connects to the second DMA controller 122D, with the second DMA controller 122D connecting to the second cache controller and cache bank module 126D.

A register memory module 102R has a third external cache and memory module 105R, a third internal cache 110R, a third DMA controller 122R, and a third cache controller and cache bank module 126R. The third external cache and memory module 105R connects to the third internal cache 110R. The third internal cache 110R connects to the third DMA controller 122R and the third DMA controller 122R connects to the third cache controller and cache bank module 126R. A pipeline state memory module 102P has a fourth external cache and memory module 105P, a fourth internal cache 110P, a fourth DMA controller 132, and a fourth cache controller and cache bank module 136 (FIG. 1). The fourth external cache and memory module 105P connects to the fourth internal cache 110P. The fourth internal cache 110P connects to the fourth DMA controller 132, with the fourth DMA controller 132 connecting to the fourth cache controller and cache bank module 126R. The microprocessor pipeline 190 connects to the first cache controller and cache bank module 126I, to the second cache controller and cache bank module 126D, to the third cache controller and cache bank module 126R, and to the fourth cache controller and cache bank module 136.

The first DMA controller 122I and the first cache controller and cache bank module 126I communicate with the microprocessor pipeline 190 for executing instructions while the first DMA controller 122I and the first cache controller and cache bank module 126I utilize the first internal cache 110I and first external cache and memory module 105I for memory storage. The second DMA controller 122D and the second cache controller and cache bank module 126D communicate with the microprocessor pipeline 190 for data operations while the second DMA controller 122D and the second cache controller and cache bank module 126D utilize the second internal cache 110D and second external cache and memory module 105D for memory storage.

The third DMA controller 122R and the third cache controller and cache bank module 126R communicate with the microprocessor pipeline 190 for register operations while the third DMA controller 122R and the third cache controller and the cache bank module 126R utilize the third internal cache 110R and the third external cache and memory module 105R for memory storage (FIG. 1). The fourth DMA controller 132 and the fourth cache controller and cache bank module 136 communicate with the microprocessor pipeline 190 for pipeline state operations while the fourth DMA controller 132 and the fourth cache controller and cache bank module 136 utilize the fourth internal cache 110P and the fourth external cache and memory module 105P for memory storage.

Figure 2:
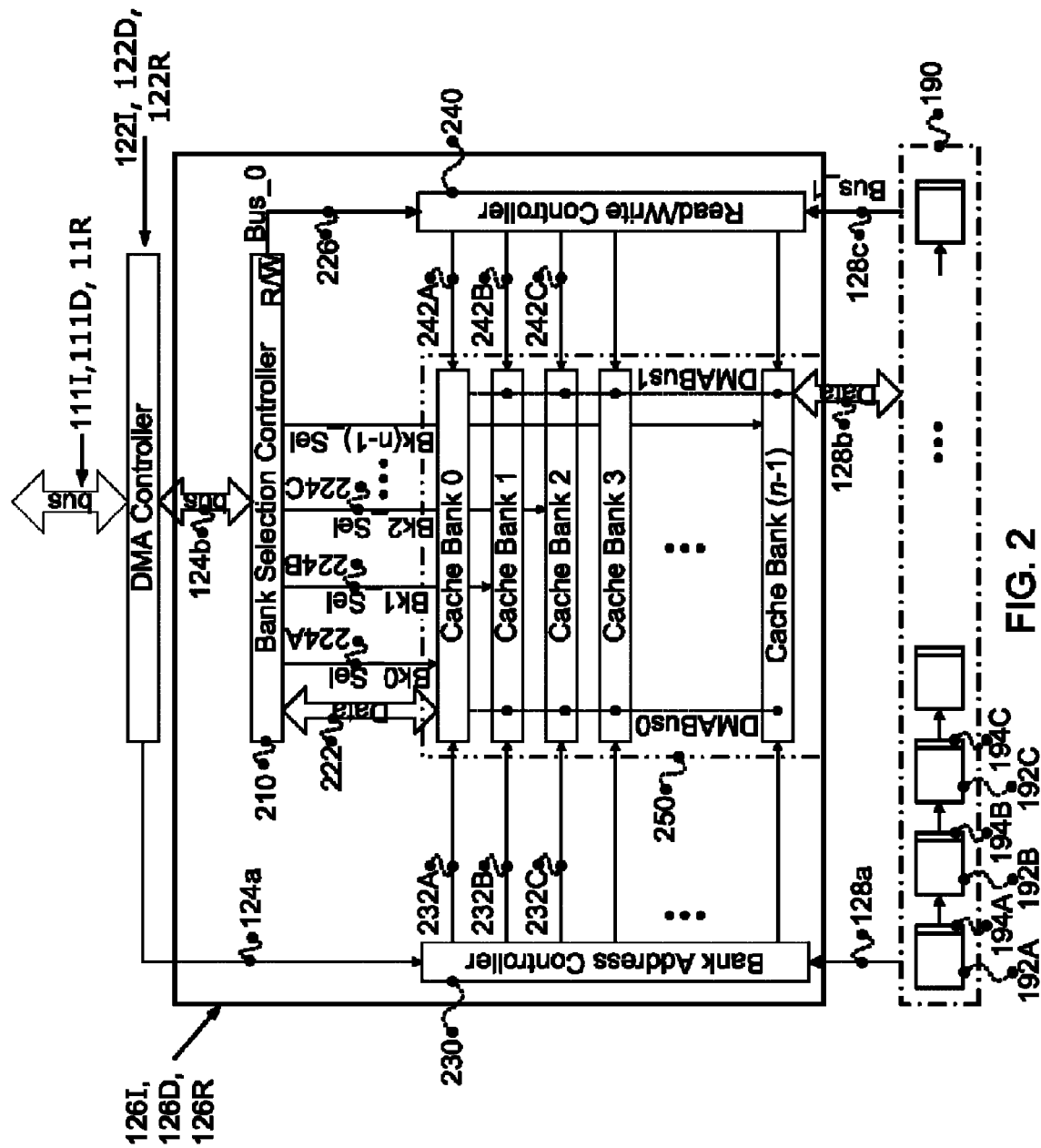
Figure 3:
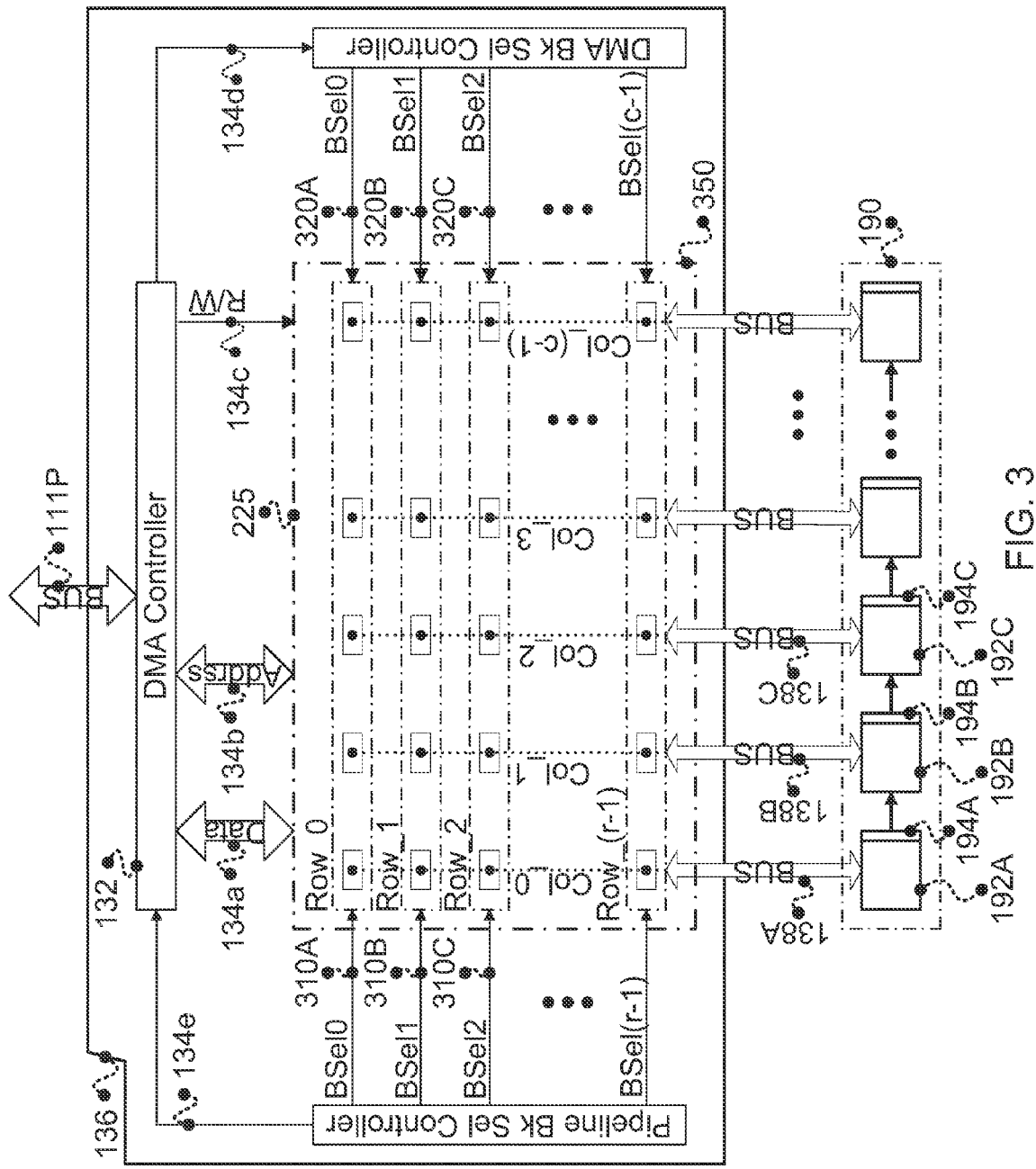
Figure 4A:
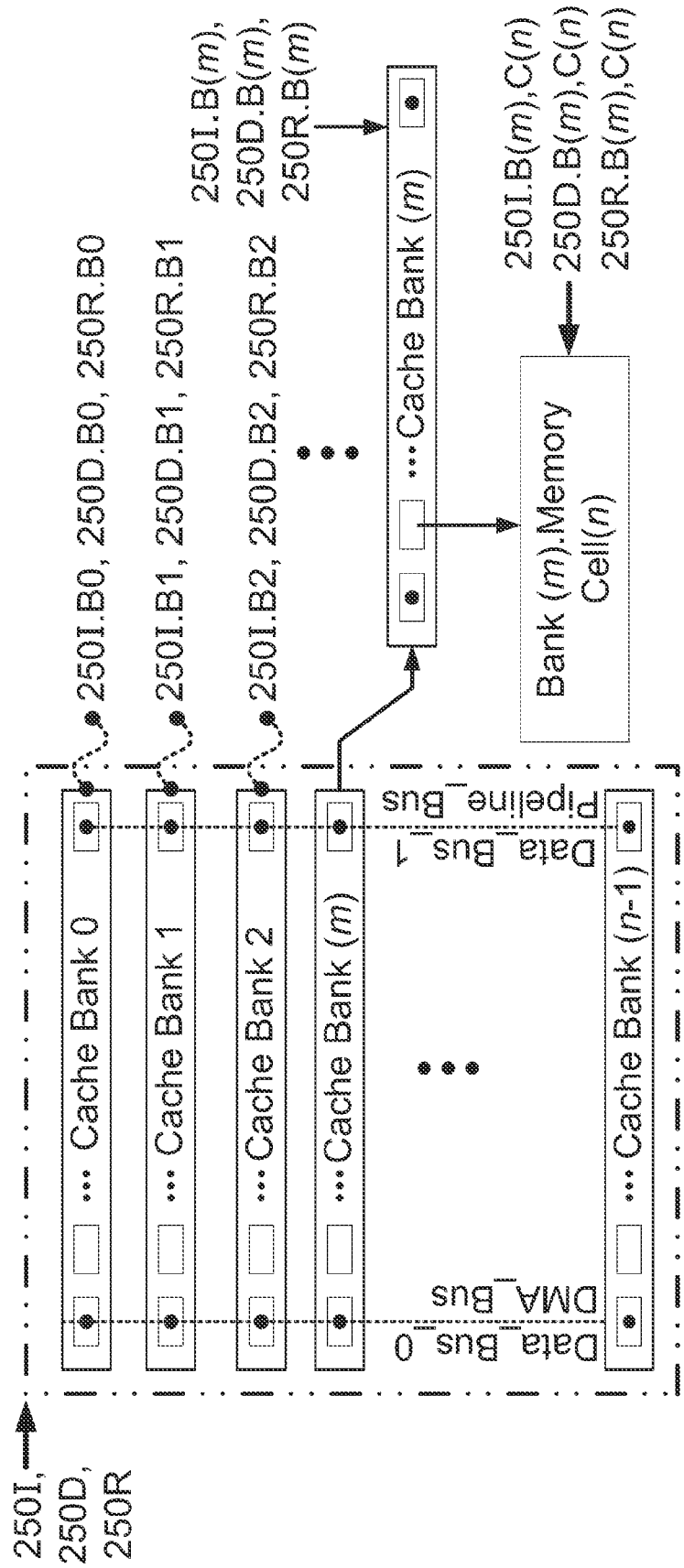
Figure 4B:
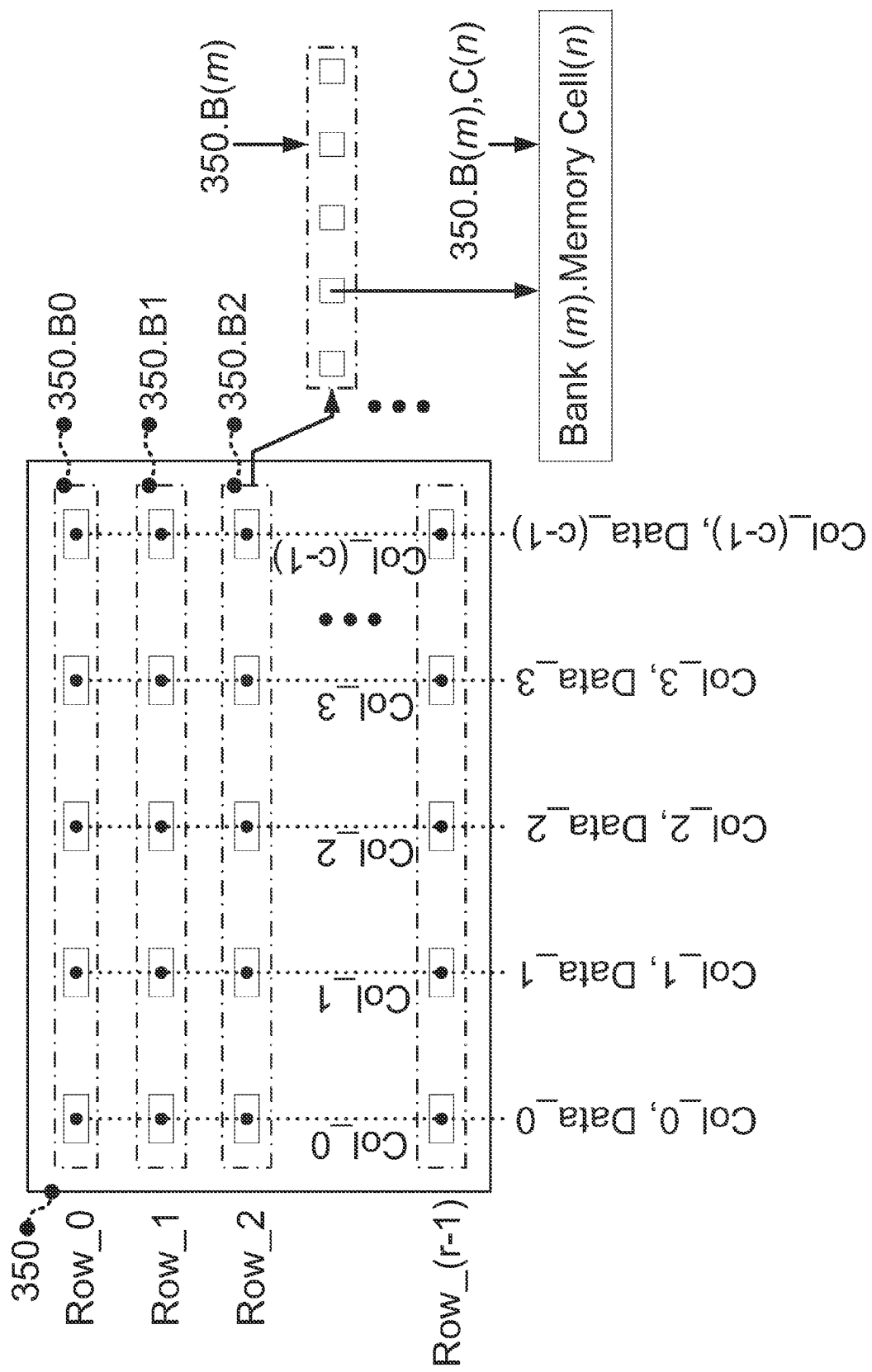

With reference to FIG. 2, the instruction 126I, data 126D, and register 126R cache bank controllers are configured to only write one block at a time from/to the processor pipeline 190. There is a tradeoff between cache bank size and writing data in parallel. The DMA/Cache Bank Controllers 120 (120I, 120D, and 120R) use a parallel bus implementation to copy to (L1, L2, L3, etc. caches, external caches and main memory) memory. The pipeline caching structure also allows for the execution pipeline 190 to run at full speed while hardware controllers provide cache to memory (L1, L2, L3 etc. level caches and main memory) copy operations in parallel. In 130, a fully parallel DMA/cache bank controller is shown; however, the fully parallel version is significantly more complex, and in 120 (120I, 120D, and 120R) cache memory size is more important than fully parallel. The instruction, data, and register cache bank controllers can also be configured for fully parallel using DMA/cache controller bank 130.

With reference to FIGS. 1, 2, 3, 4A, 4B and 5, a typical process is allowed to run for milliseconds before context switching 500 (500A, 500B, 500C, . . . ) to the next process. As long as the DMA Controller/Cache Memory Banks in (120I, 120D, 120R and 130) can complete background copy operations on the order of milliseconds, the processor 100 does not "see" any of the background operations. Since memory (110I, 110D, 110R, and 110P) and (105I, 105D, 105R, and 105P) can now run at a much lower clock frequency, significant power savings results without decreasing processor performance.

Figure 5:
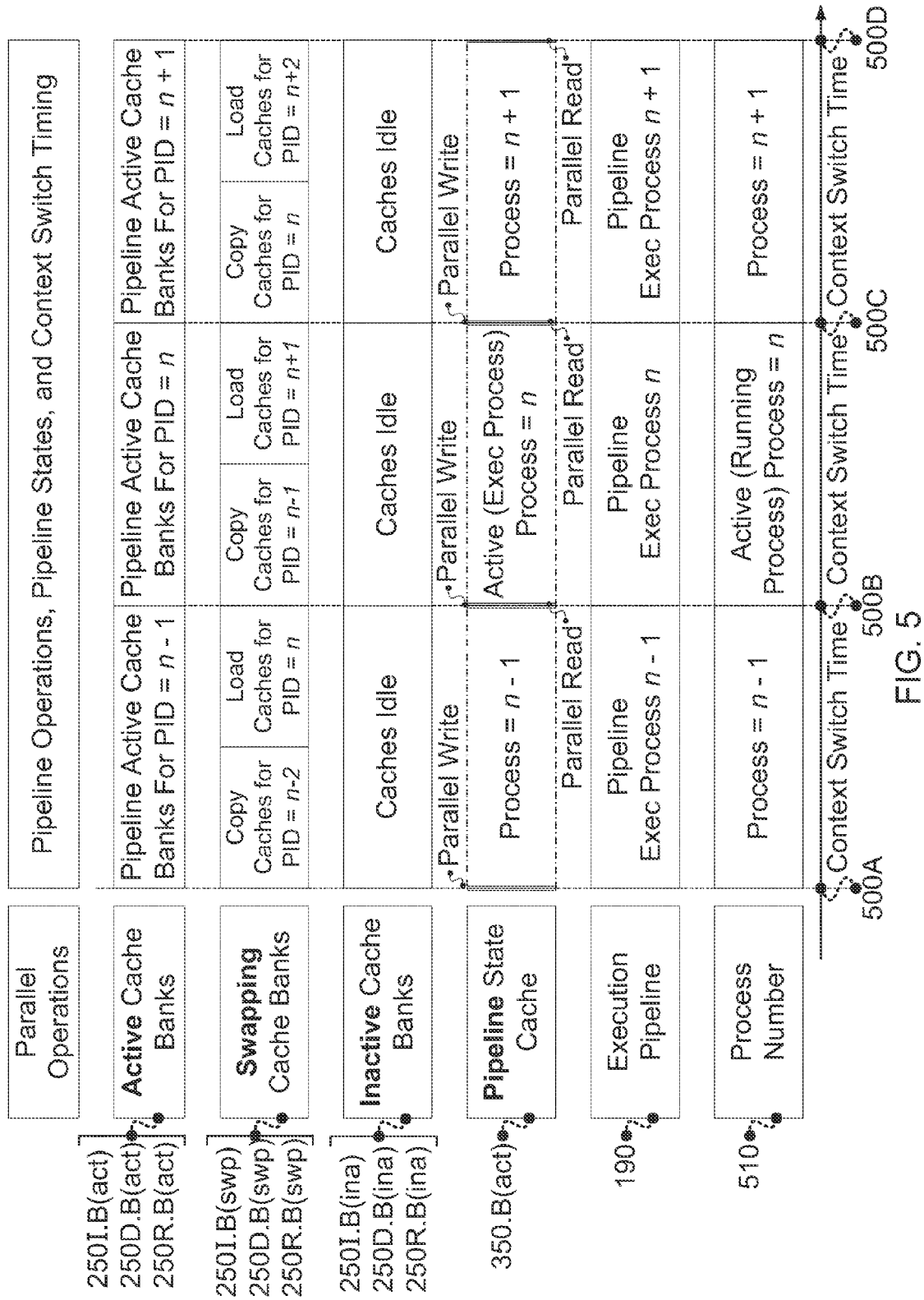

FIG. 5 illustrates the write and load cache bank operations for processes n−1, n, and n+1. We use sequential numbers to simplify the figure. In an actual system, the process identification numbers would be arbitrary. The load (read) and write cycles for each cache bank 126I, 126D, 126R, and 136 are shown. This is a worst case example showing cache writes and loads for each context switch in 500. Data locality would limit the number of writes and loads resulting in more time to copy memory, allowing for more power savings. Fully parallel memory copy operations for pipeline stage cache bank 130 are shown for block 136. The "B(•)" notation refers to cache bank number (•) or a set of bank numbers (•)'s. The instruction, data, register, and pipeline state cache controller banks (126I, 126D, 126R, and 136) consist of cache banks in (1) active use (250I.B(act), 250D.B(act), 250R.B(act), and 350.B(act)) by execution pipeline 190, (2) inactive cache banks (250I.B(ina), 250D.B(ina), 250R.B(ina), and 350.B(ina)) not in use by execution pipeline 190 and not in use by DMA Controllers (122I, 122D, 122R, and 132), and (3) swapping set cache banks (250I.B(swp), 250D.B(swp), 250R.B(swp), and 350.B(swp)) in use by DMA Controllers (122I, 122D, 122R, and 132).

FIG. 5 illustrates the background DMA controller 122I, 122D, 122R, and 132 operations that run in parallel with the execution pipeline 190. At process n start 500B, the active pipeline state cache banks 350.B(act) are copied in parallel into the plurality of pipeline latches 194A, 194B, 194C, . . . . At the end of context 500B (process n undergoes a context switch), the pipeline state latches 194A, 194B, 194C, . . . are copied in parallel to the active pipeline state cache bank 350.B(act). During context time 500B-500C, the inactive cache banks 250I.B(ina), 250D.B(ina), 250R.B(ina), and 350.B(ina) are idle. For process n−1, the swapping set cache banks 250I.B(swp), 250D.B(swp), 250R.B(swp), and 350.B(swp) are copied to L1 level caching 110I, 110D, 110R, and 110P. The swapping set cache banks 250I.B(swp), 250D.B(swp), 250R.B(swp), and 350.B(swp) for process n+1 are loaded into cache banks 250I.B(m), 250D.B(m), 250R.B(m), and 350.B(m) to prepare to execute process n+1 during the next context time 500C-500D. At context switch 500C, the cache banks 250I.B(m), 250D.B(m), 250R.B(m), and 350.B(m) are set to active (250I.B(act), 250D.B(act), 250R.B(act), and 350.B(act) are now in use by execution pipeline 190).

OS information assurance for data is implemented in hardware. By extending the traditional Unix® file permissions bits down to each register, each memory cache bank and each cache memory bank address, the architecture 100 provides hardware level information assurance. The notation (I, D, R) shows a plurality of elements (for example cache banks: 120I, 120D, and 120R).

Figure 6:
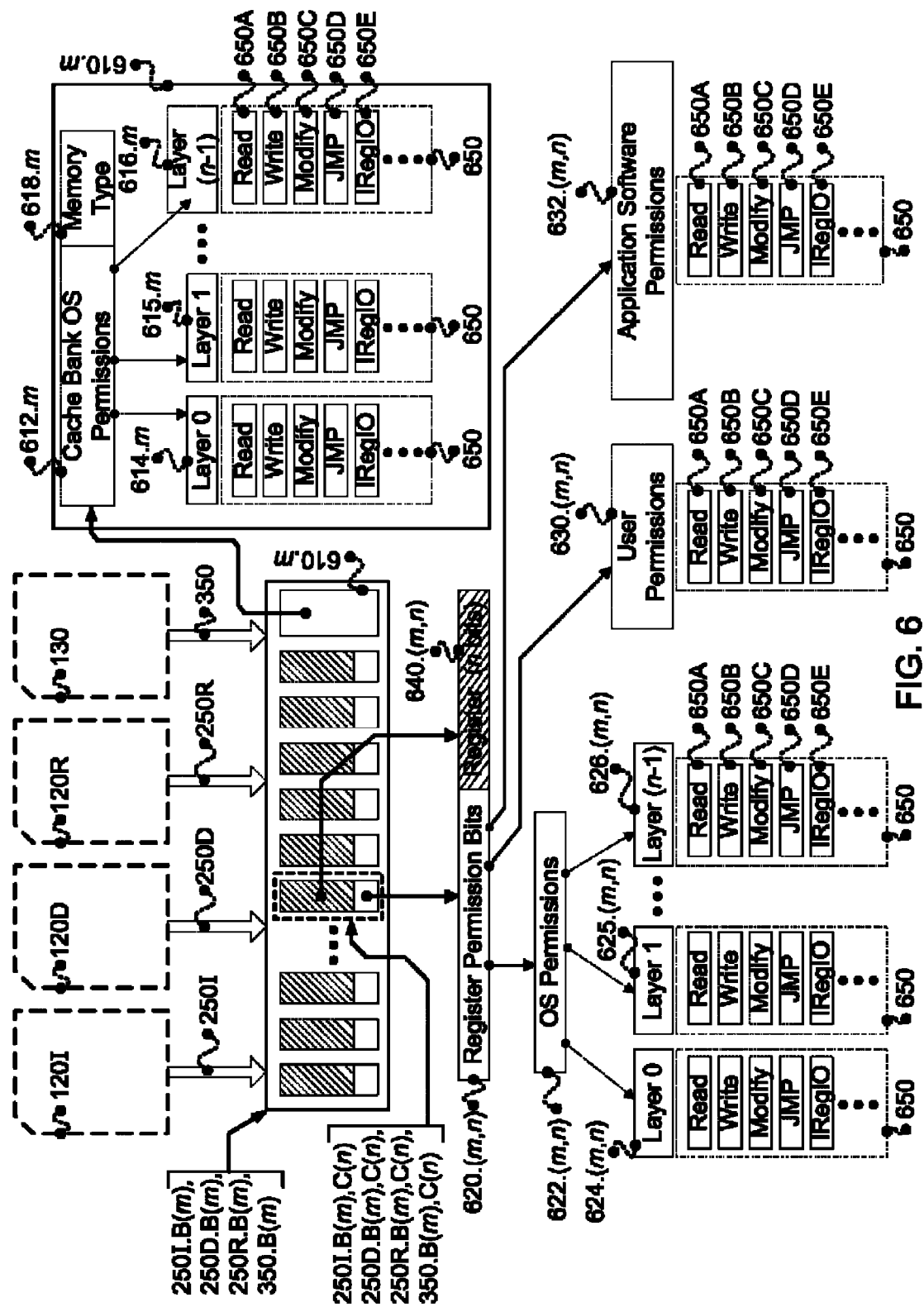

FIG. 6 illustrates hardware level information assurance. Each cache controller bank 126I, 126D, 126R, and 136 (FIGS. 1, 2, 3 and 4A and 4B) has a set of OS level permission bits 610.$m$. Memory type field 618.$m$ in cache banks (126I, 126D, 126R, and 136) is used to define data types; for example, data space, stack space, heap space, integer, floating point, etc. Only the OS has permission to access and modify cache bank permission bits 610 (all 610.$m$ references). OS level access to cache controller banks 126I, 126D, 126R, and 136 is divided into access layers: layer__0, 614.$m$, layer__1, 615.$m$, layer__2, 616.$m$, etc. Example permission bits are shown in 650. The permission bits in 650 can easily be extended by those skilled in microprocessor and OS arts. Each cache memory bank has permission bits for each memory cell 620.($m, n$) where m is the cache bank number, and n is the memory cell (memory address). Each cache bank memory cell 620.($m, n$) has permission bits for the OS layers 622.($m, n$), Process (User Level) 630.($m, n$), and Applications 632.($m, n$). The OS permission bits are further divided in OS layers: layer__0, 624.($m, n$), layer__1, 625.($m, n$), etc. Additional permission bits can easily be incorporated herein by those skilled in OS and microprocessor arts.

In FIG. 6, permission bit JMP 650D provides OS level control of jump or branch on index register instructions. This prevents malware from utilizing a jump or branch on an index register to access protected memory. Permission bit Index Register I/O (IRegIO) 650E allows OS to provide an index register pointing to an input/output (I/O) port or I/O memory address. The IRegIO bit 650E "locks out" the register 640.($m$, $n$), or cache bank (250I, 250D, 250R or 350) from being read, written to, or modified. The running process is prevented from accessing the contents of the register; however, the process can use the register to read/write I/O. Registers 640.($m$, $n$), can be used to define data types using two registers for minimum value and maximum value. For example, the type IOMemAddressType could be defined as minimum=0, and maximum=15. If a register of type IOMemAddressType is outside the minimum/maximum range, then the processor will generate an out-of-range exception.

Figure 7:
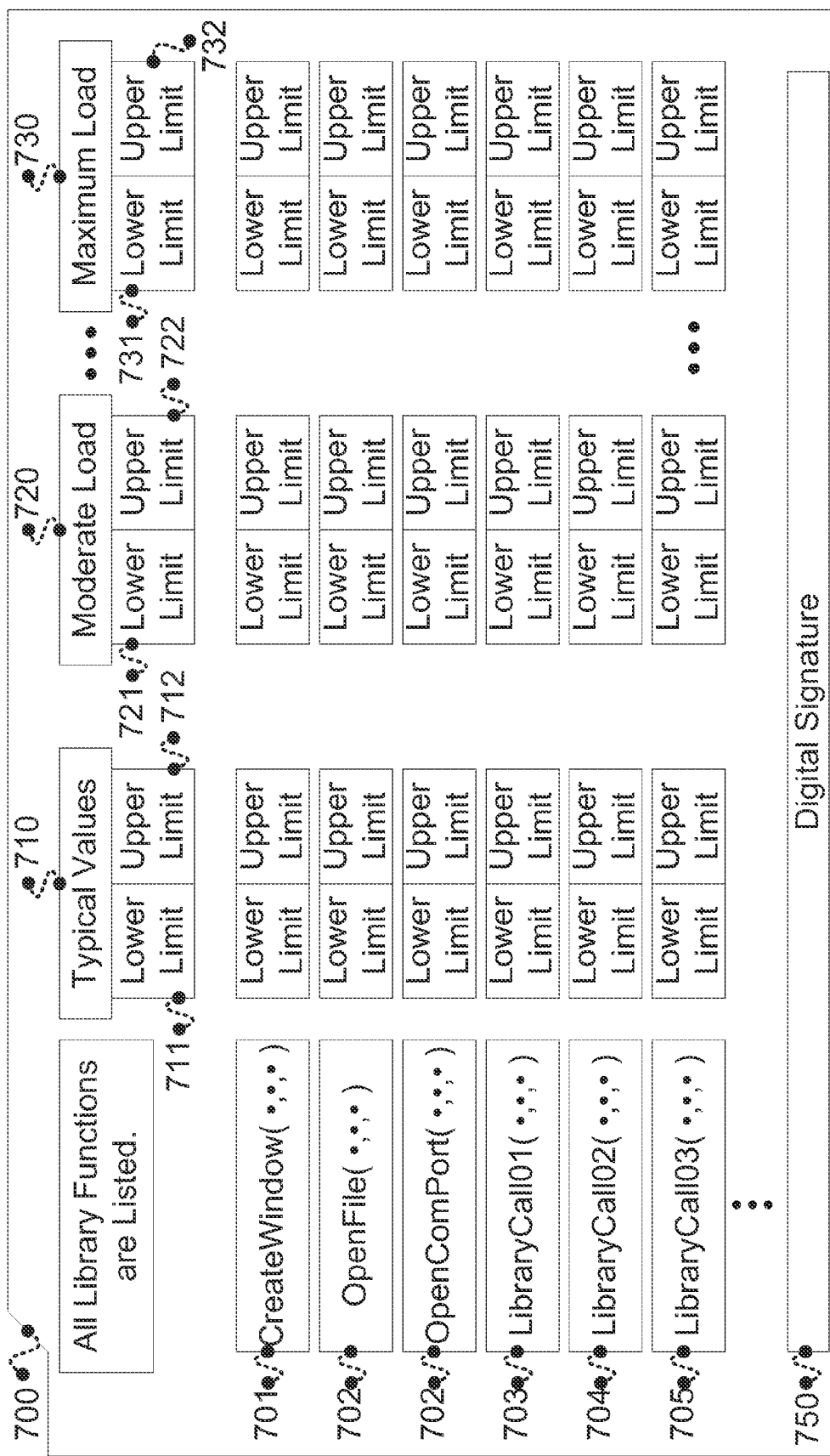

FIG. 7 extends the principal of least privilege to the library function call level. A table 700 listing all possible library function calls the application software may use is created. Each possible library function call 701, 702, 703, ... is listed with typical 710, moderate load 720, maximum load 730, etc. lower and upper limits. For example, the OpenFile (•) library function call 702 privilege limits. If the minimum number of open files is 0, the lower limits for cases 711, 721, and 731 is 0. If the typically user will only have 5 files open at a time, the upper limit for typical 712 is 5. The upper limit for a moderate load is found in 722. Maximum load upper limit 732 specifies the maximum number of files that may be open at a time. Exceeding the upper limits in 712, 722, and 732 can be set to (1) require higher than user level privileges, or to (2) generate an exception. The digital signature in 750 provides authentication of the library function call table and its permission settings 710, 720, 730, etc.

The OS Friendly Microprocessor Architecture 100 offers new opportunities for increased performance and decreased power consumption by providing hardware structures specifically selected for optimizing system-level operations frequently instantiated by an OS. Sections [0031] through [0039] give a first-order approximation of the potential benefits in OS Friendly Microprocessor Architecture's 100 performance. Sections [0040] through [0063] give a first-order approximation of power reductions offered by the new design 100. A speedup is estimated for a zero overhead context switch in section [0064].

Figure 8:
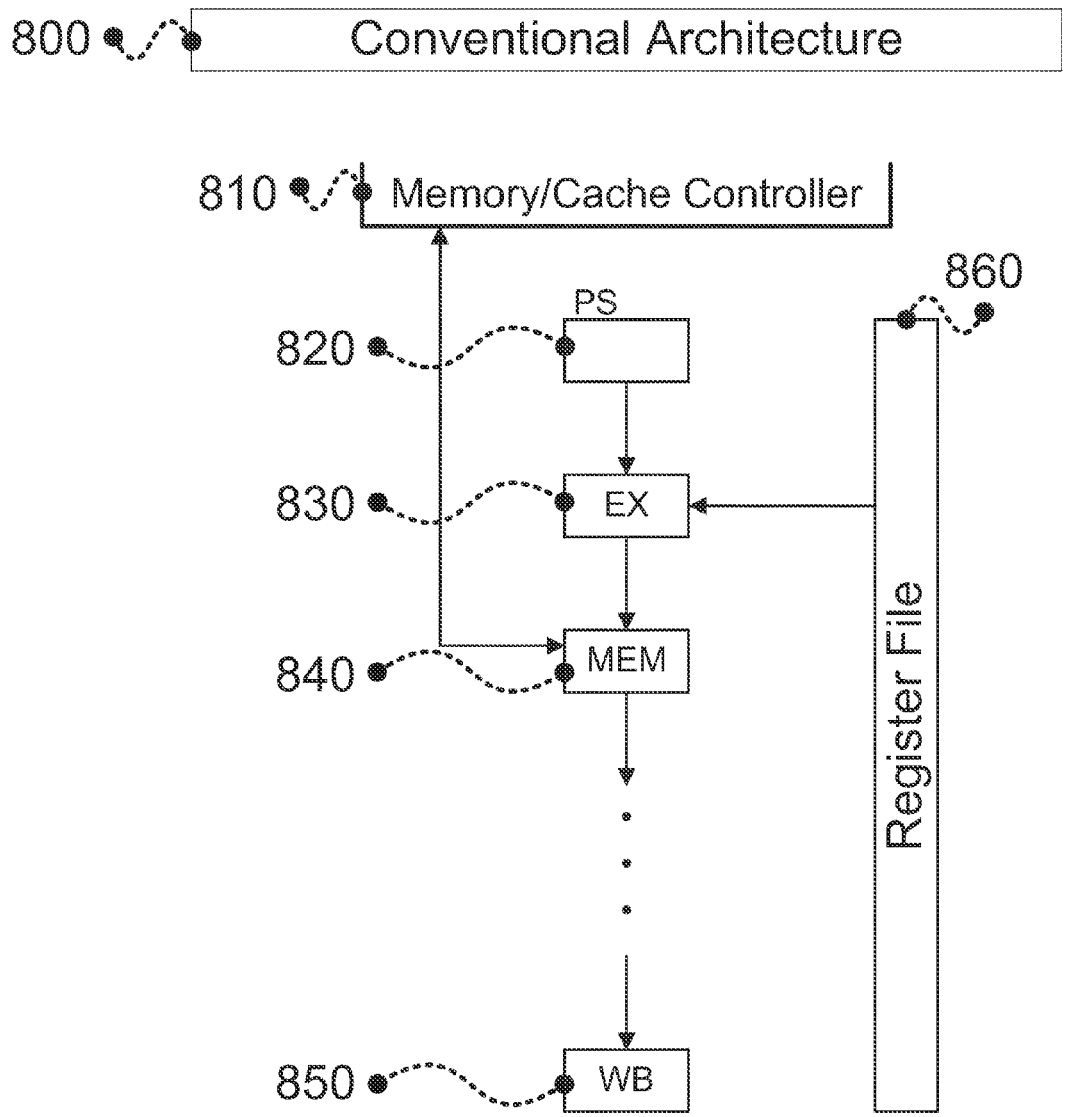
Figure 9:
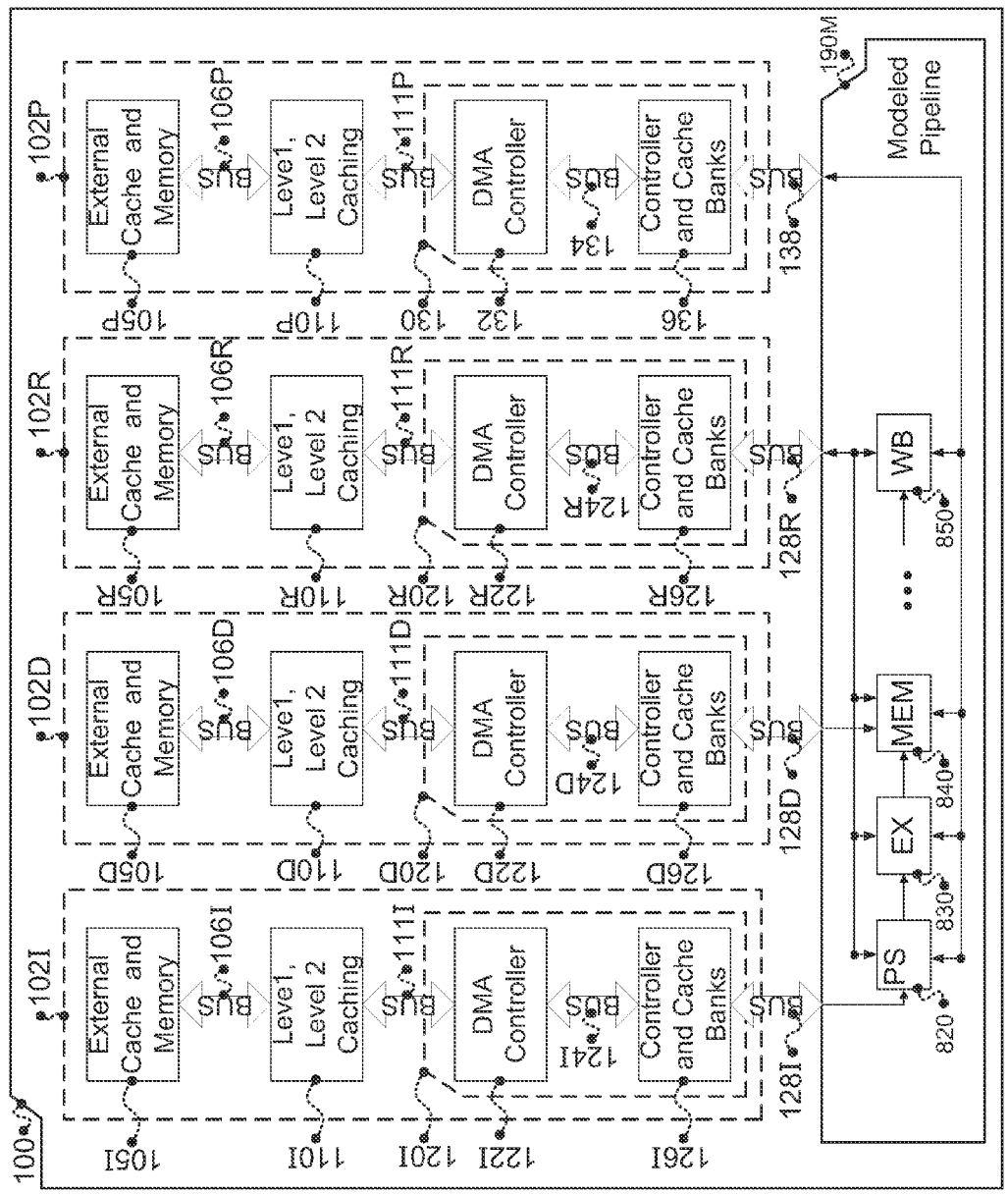
Figure 10:
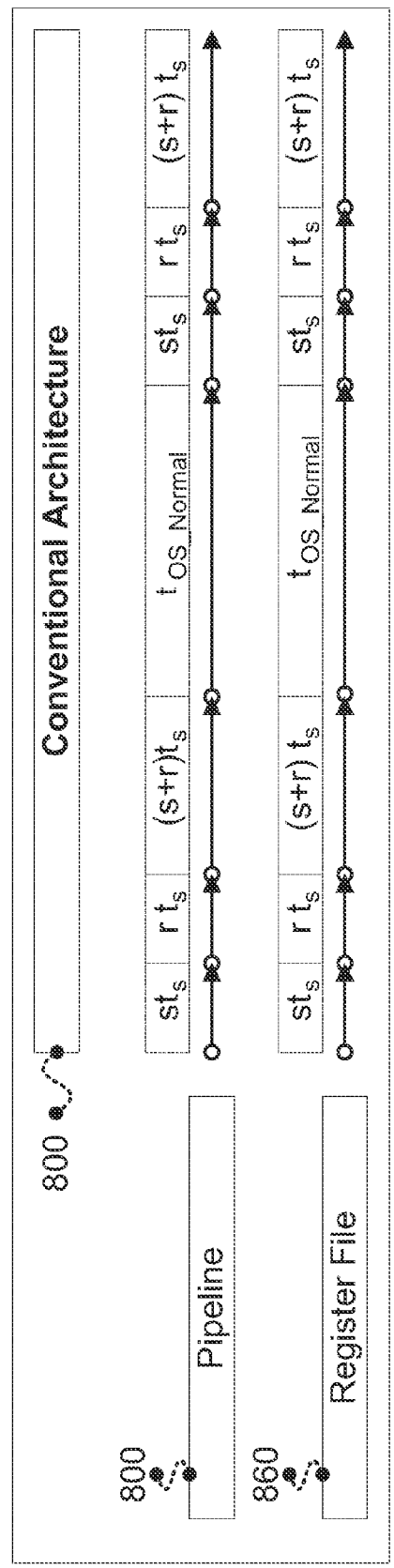
Figure 11:
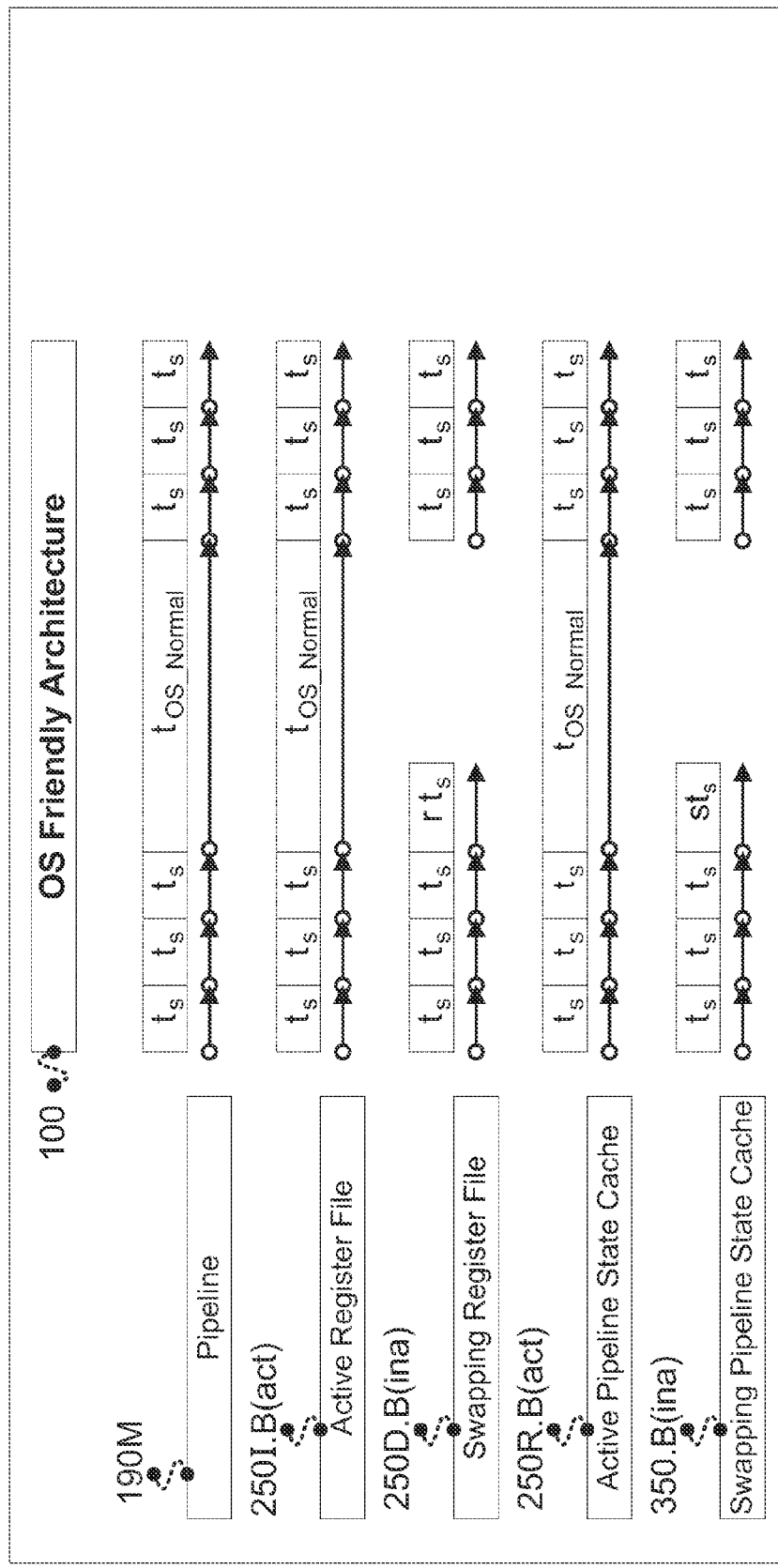
Figure 12:
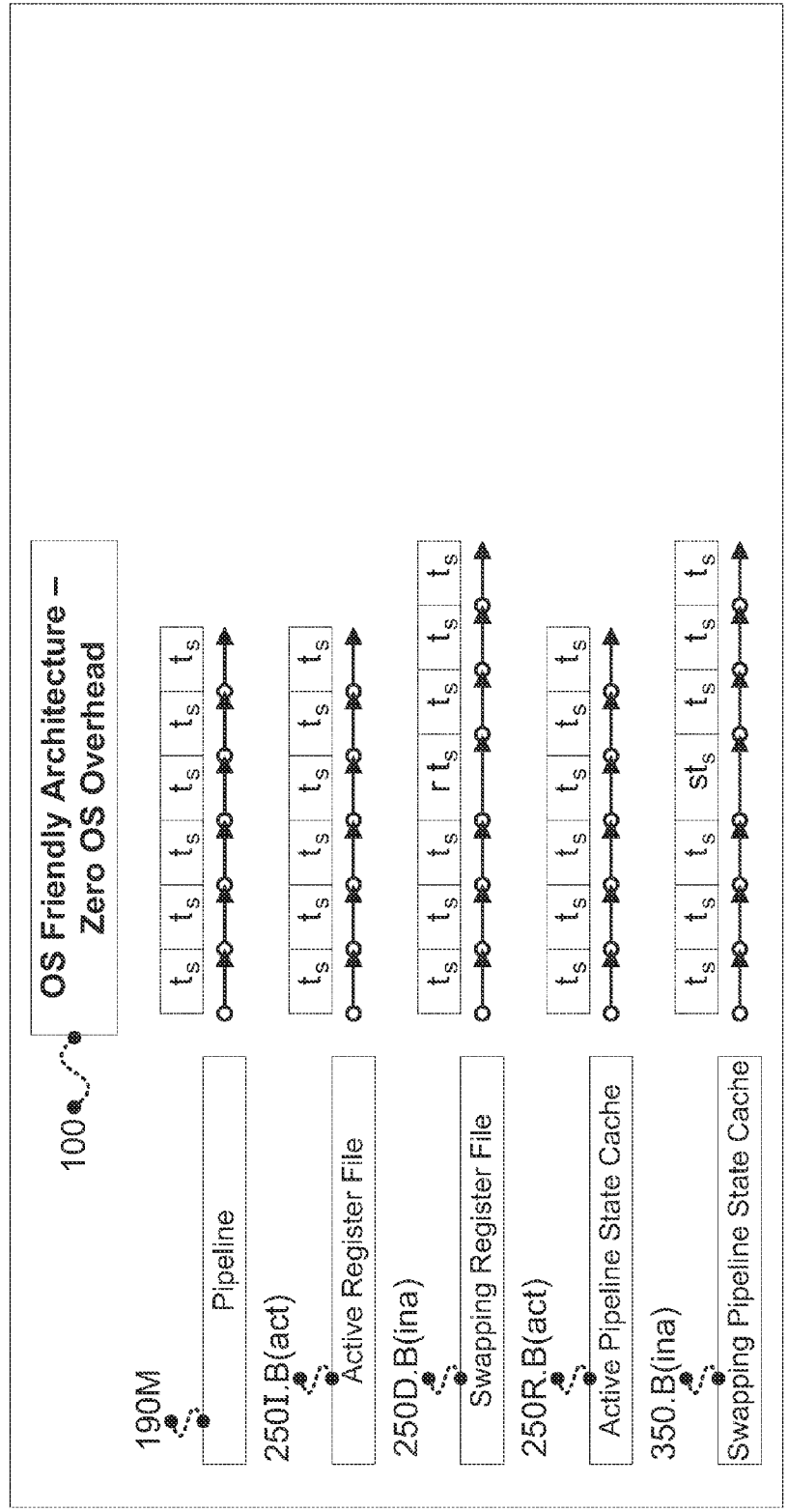

FIG. 8 is the execution pipeline for conventional architecture and FIG. 9 demonstrates the modeled execution pipeline of FIG. 8 in present invention. In FIGS. 10, 11 and 12, the estimated time for a context switch for both a conventional architecture 800 and the new OS Friendly Architecture (OSFA) 100 are compared.

The high-level representations of the conventional 800 and improved architectures 100 of the present invention are further explained below concerning FIGS. 8 through 12. These figures assume the following architectural characteristics. First, the internal designs of the execution pipelines in the two architectures 100 and 800 are the same. The labels inside the pipeline stages (labeled "PS" 820 in FIG. 8 and FIG. 9) refer to the stages to which the following sections reference (EX: Execution Stage 830, MEM: Memory Access Stage 840, and WB: Writeback Stage 850). Next, it is assumed that the pipelines in both architectures, OS Friendly 100 and conventional 800, operate at a fixed voltage $V_{P\_H}$ with clock period $t_S$. The Register File Set (RFS) active cache bank 250R.B(act) and the Pipeline State Cache Sets (PSCS) active cache bank 350.B(act) normally operate at voltage $V_{R\_H}$ with clock period $t_S$. For power improvements, the OSFA 100 can dynamically scale down both the voltages and clock rates of the inactive and swapping components. The voltage of these components can be reduced to some value $V_L$, while the clock period of these components can be reduced to some value $t_L$.

In the estimation of the potential improvements in execution time offered by the OS Friendly Architecture 100, the next sections present the steps taken by conventional processor architecture 800 in FIG. 8 and OSFA architecture 100 in performing a context switch. Each step requires a certain period of time, which is determined by the amount of work required by the step, the clock rate of the components involved, and the parallelism exploited by these components.

FIG. 5 presents a worst case timing diagram for the OS Friendly Architecture assuming swapping set cache banks (250I.B(swp), 250D.B(swp), 250R.B(swp)) and 350.B(swp) must be loaded and written for every context switch 500. Data locality will significant reduce the number of cache bank memory copy operations.

All components of the conventional architecture 800 operate with the short clock period $t_H$. The OSFA 100 pipeline 190M (model of pipeline 190 used to compare 100 to conventional 800) also operates with clock period $t_S$. In the determination of the clock rate of the OSFA's other components, the RFS cache banks 250R.B(m) and the PSCS cache banks 350.B(m) are each divided into three sets: active, inactive, and swapping set. One of the register cache banks 250.B(act) is active and one of the pipeline state caches 225.AP is active. (FIGS. 5, 8, 9, 10, 11 and 12) These active cache banks 250R.B(act) and 350.B(act) are those that are in use by the pipeline 190M where M refers to the pipeline model described herein. There is then a subset of the other register cache banks 250.B(m)'s and a subset of the other pipeline state caches 350.B(m)'s that are either flushing state out to the DMA controllers (122I, 120D, 120R and 132) or bring state back from the DMA controllers (122I, 120D, 120R and 132). These subsets are designated as the swapping sets where s is the set $\{s_0, s_1, s_2, \ldots\}$ from 250.B(m)'s and 350.B(m)'s cache memory banks. The remaining register files and pipeline state caches are referred to as inactive. The active components 250.B(act) and 350.B(act) operate with clock period $t_S$, the swapping components 250.B(swp) and 350.B(swp) operate with the longer clock period $t_L$, and the inactive components 250.B(ina) and 350.B(ina) are idle.

With reference to FIGS. 8 and 10, the steps involved in a context switch for the conventional processor 800 include the following:

TABLE 1

(1) Flush the pipeline state out to the register file.
(2) Write out each register value to memory.
(3) Bring the OS register state back into the register file.
(4) Refill the pipeline with the OS's pipeline state.
(5) Execute the standard OS operations.
(6) Flush the OS pipeline state to the register file.
(7) Write out each register value to memory.
(8) Bring the register state of another process p back into the register file.
(9) Refill the pipeline with p's state.

Assuming the pipeline 820 ... 850 in FIG. 8 has s stages, step 1 will require s clock ticks, and hence $s \cdot t_S$ time. The next step—writing each register file out to memory—requires reading each register value into the EX stage 830, moving it into the MEM stage 840, and then flushing it out to memory 850. This is three ticks for each register value, but since the operations can be performed in a pipelined fashion, we approximate this as $r \cdot t_S$ time total for all r registers. Step 3 requires filling up the pipeline to retrieve register values from memory·requiring s ticks·then writing each value back to the register file in the writeback stage 850 for a total of $(s+r) t_S$ time. Step 4 is filling the pipeline back up with values from the register file, but this can be pipelined with the register file refill and hence is already accounted for. Step 5 takes some unknown amount of time $t_{OS\_NORMAL}$ that is dependent on the OS design. Steps 6 and 7 are similar to steps 1 and 2, which again require $s \cdot t_S$ time and $r \cdot t_S$ time, respectively. Step 8 is like step 3 which requires $(s+r) t_S$ time, and step 9 is like step 4 which is accounted for in this time. Hence, an expression that approximates this entire process is given by Equations (1) and (2).

$$t_{CS_{CONV}} = st_s + rt_s + (s+r)t_s + t_{OS_{NORMAL}} + st_s + rt_s + (s+r)t_s \quad (1)$$

$$t_{CS_{CONV}} = 4t_s(r+s) + t_{OS_{NORMAL}} \quad (2)$$

With reference to FIGS. 5, 11 and 12, the OSFA 100 performs the following steps in a context switch:

TABLE 2

(1) Flush the pipeline state 190M out to the active pipeline state cache 350.B(act).
(2) Switch the active pipeline state cache and register cache to the banks containing the OS state
(3) If necessary (if free slots in the PSCS 350 and RFS 250 are needed), flush the contents of the previous process' pipeline state cache in 350.B(m) and register file in 250R.B(m) for the previous process ID (PID) in FIG. 5.
(4) Bring the OS's pipeline state back into the pipeline 190M from the pipeline state cache 350.
(5) Execute the standard OS operations.
(6) Flush the pipeline state 350.B(m) out to the active pipeline state cache 350.B(act).
(7) If necessary, fetch the state of the next process for execution from memory into the PSCS 350.B(m) and RFS 250R.B(m).
(8) Switch the active pipeline state cache 350.B(act) and register files 250.B(act) to the caches containing new (next) process (for example PID(n + 1)).
(9) Parallel copy the contents of the active pipeline state cache 350.B(act) back into the pipeline 190M latches 194A, 194B, 194C, . . .

The key feature of the OSFA 100 is that parallelism takes place at various levels to reduce execution time. In step 1, all pipeline stages flush state to the active pipeline state cache 350.B(act) simultaneously, and hence this requires only one tick at the high clock rate for a time of $t_S$. Step 2 takes also a single tick to switch to the next active cache (next process' active pipeline state cache bank 350.B(act)) and next active register file (next process' active register cache bank 250R.B (act)). Step 3 takes s ticks for the pipeline state cache 350.B (m) and r ticks for the register file 250.B(m). However, these steps can be completed at the same time as steps 4-6, so as long as they are completed in at most the time for those steps, the pipeline will not see them. It is reasonable to assume that step 3 can be completed in less time (if, for the time being, we ignore cache misses and contention), as the pipeline state and register file are relatively small, while the OS must generally perform several system operations before switching back to a user-level process. Step 4 is the reverse of step 1, so it requires only a single tick. Step 5 still takes $t_{OS\_NORMAL}$ as with the conventional architecture, and step 6 takes a single tick like step 1. Step 7 is the reverse of step 3 and requires the same amount of time. But again, these steps can be performed in parallel with those of 4-6. Step 8 is the same as step 2, and step 9 is the same as step 4. Each of these takes one tick. Hence, the total time, Equation (3), for the context switch, $t_{CS\_OFA}$, for OSFA 100 is found in Equation (4).

$$t_{CS\_OFA} = t_S + t_S + t_S + t_{OS\_NORMAL} + t_S + t_S + t_S \quad (3)$$

$$t_{CS\_OFA} = 6t_S + t_{OS\_NORMAL} \quad (4)$$

So, ignoring the $t_{OS\_NORMAL}$ term—we will assume it is the same for conventional 800 and OS Friendly Architecture 100—the speedup offered by the OSFA 100 for context switching overhead is estimated to be Speedup$_{OFA}$ in Equation (5). As shown in (6), including $t_{OS\_NORMAL}$, the speed up is order the number of registers, $O(r)$, for a large number of registers.

$$Speedup_{OFA} \approx \frac{4st_s + 4rt_s}{6t_s} \approx \frac{2}{3}(s+r) = \frac{2}{3}(5+32) = 25 \quad (5)$$

$$Speedup_{OFA} = \frac{4st_s + 4rt_s + t_{OS\_NORMAL}}{6t_s + t_{OS\_NORMAL}} \approx \quad (6)$$

$$\frac{4r + t_{OS\_NORMAL}}{6 + t_{OS\_NORMAL}} \approx \frac{4r + t_{OS\_NORMAL}}{t_{OS\_NORMAL}} \approx \frac{4r}{t_{OS\_NORMAL}} \approx O(r)$$

For example, for a five-stage pipeline and 32 general-purpose registers, this translates to an estimated theoretical speedup of 25 found in (5) for OSF 100. This is a significant order of magnitude speedup improvement for the OSF 100 compared to the conventional processor architecture 800.

The power analysis is more involved, as it must consider not only the time of execution, but also which components are active, the properties of their internal circuits, their operating voltage, and other aspects. Considering the equation given by Mudge*, an expression for the dynamic power consumption of a CMOS circuit, ignoring the short circuit current of the gates, is found in (7) where A is a value between 0 and 1 indicating the switching activity of the transistors in the circuit, C is the capacitance at the gates' outputs, V is the operating voltage of the circuit, and f is its operating frequency.

*T. Mudge: "Power: a first-class architectural design constraint," Computer, vol. 34, no. 4, pp. 52-58, April 2001.

$$P_D = ACV^2 f \quad (7)$$

To assess the power consumption of the processors, we use Component-level Timing Diagrams to illustrate which components are active and at what times. FIG. 10 and FIG. 11 show two component-level timing diagrams: one for the conventional architecture 800 during a context switch, and another for the OSFA 100 during a context switch 500A, 500B, 500C, . . . . The diagram shows the OSFA 100 executing the context switch in less time than the conventional architecture 800, as previously described. However, the parallelism requires that more components are active during execution, and so its power consumption relative to the conventional architecture is not immediately clear.

Equation (7) can be used to estimate the relative dynamic power consumption. When all components in both architectures 100 and 800 are operating with frequency $1/t_S$, the voltage of all components is assumed to be the same value, $V_H$. The activity values, $A_P$, and the capacitance values, $C_R$, of the pipelines are assumed to be the same for both architectures. Similarly, these values are assumed to be the same for all register files, and are referred to as $A_R$ and $C_R$ for the activity levels and the output capacitances, respectively. Combining these into constants $\alpha_p$ for the pipeline and $\alpha_R$ for the purposes of calculating average power dissipation, the formula for the average power consumption of the conventional architecture, $P_{D\_CONV}$, is found in Equations (8) and (9).

$$P_{D\_CONV} = P_{D\_Pipeline} + P_{D\_RegisterFile} \quad (8)$$

$$P_{D\_CONV} = \alpha_P V_{P\_H}^2 \frac{1}{t_s} + \alpha_R V_{R\_H}^2 \frac{1}{t_s} \quad (9)$$

For the OSFA 100, the average power consumption of the pipeline and active storage components can be calculated as before, from Equation (7), but the average power of the swapping components must be calculated from the energy and time as follows in (10).

$$P_{D_{OFA}} = P_{D\_Pipeline} + P_{D\_ActiveRegisterFile} + P_{D\_ActivePipelineCache} + \quad (10)$$
$$\frac{(6t_s + rt_s)P_{D\_ActiveRegisterFile}}{6t_s + t_{OS\_NORMAL}} + \frac{(6t_s + st_s)P_{D\_ActivePipelineCache}}{6t_s + t_{OS\_NORMAL}}$$

Assuming the active register file 250R.B(act) and pipeline state 350.B(act) consume the same power as shown in (11), $P_{D\_ActiveRegisterFile}$, (11) simplifies to Equation (12).

$$P_{D_{OFA}} = P_{D_{Pipeline}} + \frac{(24t_s + rt_s + st_s + 2t_{OS_{NORMAL}})P_{D_{ActiveRegisterFile}}}{6t_s + t_{OS_{NORMAL}}} \quad (11)$$

$$P_{D_{OFA}} = \alpha_P V_{P\_H}^2 \frac{1}{t_s} + \frac{(24t_s + rt_s + st_s + 2t_{OS\_NORMAL})\alpha_R V_{R\_H}^2 \frac{1}{t_s}}{6t_s + t_{OS\_NORMAL}} \quad (12)$$

The power overhead imposed by OSFA 100, then, is simply $P_{D\_OSFA}$ divided by $P_{D\_CONV}$. For the sake of illustration, let us estimate $t_{OS\_NORMAL}$ as $t_{OS\_NORMAL} = 2rt_S$. In this case, Equation (12) simplifies to Equation (13).

$$P_{D_{OSFA}} = \alpha_P V_{P\_H}^2 \frac{1}{t_s} + \frac{(24t_s + 5rt_s + st_s) \cdot \alpha_R V_{R\_H}^2 \frac{1}{t_s}}{6t_s + 2rt_s} \quad (13)$$

Further, previously reported data can be utilized to estimate values for the remaining unknowns. Vangal et al.* have completed research with dynamic voltage and frequency scaling with a simple execution core and corresponding register file. For the execution core, at the normal operating frequency of 5 GHz, the supply voltage is set to 0.9 V and the power dissipation is 75 mW. Using Equation (7) and solving for $\alpha_P$ in (14), and (15), we find $\alpha_P$ in (16).

*S. Vangal, et. al.: "5-GHz 32-bit integer execution core in 130-nm dual-VT CMOS," Solid-State Circuits, IEEE Journal of, vol. 37, no. 11, pp. 1421-1432, November 2002.

$$P_D = \alpha_P V_{P\_H}^2 \frac{1}{t_s} \quad (14)$$

$$75 \text{ mW} = \alpha_P \cdot 5 \text{ GHz} \cdot (0.9 \text{ V})^2 \quad (15)$$

$$\alpha_P = 18.5 \text{ pF} \quad (16)$$

Following this same approach for the register file from (17) with the parameters from Vangal et al.: frequency of 5 GHz, a supply voltage of 1.43 V, and power dissipation of 165 mW, we solve for $\alpha_R$ in Equation (18).

$$165 \text{ mW} = \alpha_R \cdot 5 \text{ GHz} \cdot (1.43 \text{ V})^2 \quad (17)$$

$$\alpha_R = 16.1 \text{ pF} \quad (18)$$

Assuming again, a standard five-stage pipeline and a 32-entry register file for Equation (14), this allows for solving for the dynamic power increase, $I_P$, required for the OSFA 100 to provide the increase in performance in (19) and (20).

$$I_P = \frac{P_{D\_OFA}}{P_{D\_CONV}} \quad (19)$$

$$I_P = 2.2 \quad (20)$$

An overhead in power consumption is to be expected, as the OSFA 100 keeps more circuitry active for a shorter period of time than the conventional architecture. However, Mudge has shown that as frequency is scaled down, supply voltage can also be lowered as illustrated in (21).

$$f_{max} \propto \frac{(V - V_{threshold})^2}{V} \quad (21)$$

Mudge also reports the quadratic relationship between power and supply voltage in (22).

$$P \propto V^2 \quad (22)$$

Hence, it is reasonable to project that as frequency is scaled down, supply voltage can be reduced, which will result in significant reductions in power. Because there is extra slack time available for the swapping register file and pipeline state cache, it is of interest to estimate the power savings from reducing the clock frequency of these components while in the swapping state. Vangal et al. have reported results from their studies with the execution core and register file for the relationships between operating frequency, supply voltage, and power consumption. When operating at the lowest reported frequency of 3 GHz, the pipeline's supply voltage is 0.8 V with a power dissipation of 50 mW. At the same frequency, the register file's supply voltage is set to 1.1 V with a power dissipation of approximately 25 mW.

Maintaining the assumption above that $t_{OS\_NORMAL} = 2rt_S$, the clock rate of the swapping register file can be reduced by a factor of 2 and still complete the swapping in time. The reduction here will be by a factor of 1.7. While Equation (9) for the power dissipation of the conventional architecture stays the same, Equation (10) reduces to (23).

$$P_{D\_OFA} = P_{D\_Pipeline} + 2P_{D\_ActiveRegisterfile} + \quad (23)$$
$$\frac{(6t_s + rt_L)P_{D\_SwappingCache}}{6t_s + t_{OS\_NORMAL}} + \frac{(6t_s + st_L)P_{D\_SwappingCache}}{6t_s + t_{OS\_NORMAL}}$$

The values, $\alpha_P$ for the pipeline 190M and $\alpha_R$ for the active register file 250R.B(act) and pipeline state 350.B(act), remain the same as in earlier equations. However, for the swapping register files and caches, the new value $\alpha_{R\_S}$ is found in (24) and (25).

$$25\text{ mW}=\alpha_{R\_S}\cdot 3\text{ GHz}\cdot(1.1\text{ V})^2 \quad (24)$$

$$\alpha_{R\_S}=7\text{ pF} \quad (25)$$

Hence, Equation (23) simplifies to (26) for the OSF 100 architecture.

$$P_{D\_OFA} = \alpha_P V_{P\_H}^2 \frac{1}{t_s} + 2\alpha_R V_{R\_H}^2 \frac{1}{t_s} + \frac{6t_s\cdot \alpha_R V_{R\_H}^2 \frac{1}{t_s} + rt_L\cdot \alpha_{R\_S} V_R^2 \frac{1}{t_L}}{6t_s + 2rt_s} + \frac{6t_s\cdot \alpha_R V_{R\_H}^2 \frac{1}{t_s} + st_L\cdot \alpha_{R\_S} V_{R\_L}^2 \frac{1}{t_L}}{6t_s + 2rt_s} \quad (26)$$

Simplifying this formula and plugging back in to Equation (19), the increase in dynamic power consumption is found in (20a).

$$I_P = \frac{P_{D\_OFA}}{P_{D\_CONV}} = 1.9 \quad (20a)$$

The estimates show that use of voltage and frequency scaling reduced the power consumption of the OSFA 100 by 13% in (27), while still sustaining substantial performance increase.

$$P_{save} = \frac{I_{P(20)} - I_{P(20a)}}{I_{P(20)}} 100\% = \frac{2.2 - 1.9}{2.2} \approx 13\% \quad (27)$$

Another option is to scale back the clock rate on all components at all times. In this case, the execution time will increase relative to the cases above in which only the swapping components are scaled. However, the decrease in performance will come with a further reduction in power consumption. Here, the frequency of all components are scaled to $1/t_L$. Hence, in FIG. 12, for the OSFA, all values of $t_S$ get replaced with $t_L$, and all the overall execution time of the OSFA 100 are found in (29) and simplified in (30).

$$t_{OFA\_scaled}=t_L+t_L+t_L+t_{OS\_NORMAL}+t_L+t_L+t_L \quad (29)$$

$$t_{OFA\_scaled}=6t_L+t_{OS\_NORMAL} \quad (30)$$

As above, assuming that the frequency is scaled by a factor of 1.7, the speedup of the OSFA 100 ignoring the $t_{OS\_NORMAL}$ term, is calculated in (31), and (32).

$$t_{OFA\_scaled} = \frac{4st_S + 4rt_S}{6\cdot 1.7t_S} \quad (31)$$

$$t_{OFA\_scaled} = 0.4(s+r) \quad (32)$$

For the five-stage pipeline with r=32 general-purpose registers for (32), $t_{OFA\_scaled}$ is found in (33).

$$t_{OFA\_scaled}=0.4(s+r)=0.4(5+32)=15 \quad (33)$$

To estimate the power consumption, the new value $\alpha_{P\_S}$ is calculated for the pipeline at the lower clock frequency in (34) and (35).

$$50\text{ MW}=\alpha_{P\_S}\cdot 3\text{ GHz}\cdot(0.8\text{ V})^2 \quad (34)$$

$$\alpha_{P\_S}=26\text{ pF} \quad (35)$$

Substituting $\alpha_{P\_S}$ in equation (35) for $\alpha_P$ in equations (14), (15) and (16) and given $t_{OS\_NORMAL}=2rt_L$, we find the dynamic power consumption for scale back case in Equation (36).

$$P_{D_{OFA_{scaled}}} = \alpha_{P_S} V_{P_L}^2 \frac{1}{t_L} + 2\alpha_{R_S} V_{R_L}^2 \frac{1}{t_L} + \frac{6t_L\cdot \alpha_{R_S} V_{R_L}^2 \frac{1}{t_L} + rt_L\cdot \alpha_{R_{SL}} V_{R_L}^2 \frac{1}{t_L}}{6t_L + 2rt_L} + \frac{6t_L\cdot \alpha_{R\_S} V_{R_L}^2 \frac{1}{t_L} + st_L\cdot \alpha_{R\_S} V_{R_L}^2 \frac{1}{t_L}}{6t_L + 2rt_L} \quad (36)$$

Using the previous assumptions about s and r to simplify, and plugging back in to Equation (19), the relative dynamic power consumption is found in (20b)

$$I_P = \frac{P_{D\_OFA\_scaled}}{P_{D\_CONV}} = \frac{0.12}{0.24} = 0.50 \quad (20b)$$

Hence, with both the pipeline and storage components scaled to the lower frequency at all times, it is expected that a significant reduction in average dynamic power will be observed. However, this result does assume a longer execution time for $t_{OS\_NORMAL}$. Taking this into account, the overall speedup for the scaled OSFA, while taking into account the lengthened time for OS activity, is found in equations (37) and (38).

$$t_{OFA\_scaled} = \frac{4st_S + 4rt_S + 2rt_S}{6t_L + 2rt_L} \quad (37)$$

$$= \frac{4st_S + 4rt_S + 2rt_S}{6\cdot 1.7t_S + 2r\cdot 1.7t_S}$$

$$t_{OFA\_scaled} = \frac{4(5)(0.2\text{ ns}) + 4(32)(0.2\text{ ns}) + 2(32)(0.2\text{ ns})}{6\cdot 1.7\cdot(0.2\text{ ns}) + 2(32)\cdot 1.7(0.2\text{ ns})} \quad (38)$$

$$= 1.8$$

With a speedup of approximately 2 in (38), we have ½ the power consumption in (20b). The figure of merit, speedup/power≈4 is found in (39).

$$\frac{\text{speedup}}{\text{power}} = \frac{t_{OFA\_scaled}}{I_{P(20b)}} \quad (39)$$

$$= \frac{1.8}{2.5}$$

$$= 3.6 \approx 4 \text{ Figure-of-merit}$$

In summary, the OSF 100, provides a substantial increase in processor performance (5) at 13% lower power compared to the conventional processor architecture 800. If the OSFA 100 clock speed was reduced to provide equivalent FLOPS/MIPS, etc., then according to (38), the lower clock speed would allow for a lower operating voltage, providing a much higher energy efficiency than estimated in (27) as compared to the conventional architecture in 800. The speedup/power figure-of-merit, equation (39), is approximately 4 times more efficient than the conventional architecture.

It is also of interest to estimate the speedup when there is no OS activity that needs to be performed between a context switch—that is, when the context switch is handled entirely by hardware. FIG. 12 compares the timing for a conventional architecture to the OS Friendly Architecture 100 where no OS activity is required. An example where no OS activity may be required is for an interrupt handler or a context switch between execution threads. In this case, $t_{OS\_NORMAL}=0$. The time for the context switch for the OSFA is given by equation (40). In table 2, Steps (3) and (7) require zero time for cache banks are preloaded into cache memory banks 250 and 350. The speedup is computed in Equations (41), (42), and (43). For a completely hardware context switch, the OS overhead is also zero. The speedup in equation (43) is approximately 35 times faster.

$$t_{OFA\_thread} = 6t_S + t_{OS\_Normal} \approx 6t_S \quad (40)$$

$$\frac{t_{OFA\_thread}}{t_{conventional}} = \frac{6t_S}{4st_S + 4rt_S + t_{OS\_Normal}} \quad (41)$$

$$= \frac{6t_s}{4st_S + 4rt_S + 2rt_S}$$

$$= \frac{6t_S}{4st_S + 6rt_S}$$

$$\frac{t_{OFA\_thread}}{t_{conventional}} = \frac{6}{4s + 6r} \quad (42)$$

$$\text{speedup} = \frac{t_{conventional}}{t_{OFA\_thread}} \quad (43)$$

$$= \frac{4s + 6r}{6} \approx \frac{2}{3}s + r$$

$$= \frac{2}{3}(5) + 32 \approx 35$$

To those skilled in the art of microprocessor design and operating systems, additional features may be incorporated into the switched, direct memory access, cache memory banks, and memory pipeline architecture in FIG. 1 (100). The additional features can take advantage of the background processing provided by the DMA/cache memory pipeline architecture in 100. The architecture 100 can also be extended to multiprocessor and multi-core architectures. The cache banks and memory cell permission bits in FIG. 6 (610 and 620, et al.) can also easily be extended.

Accordingly, various modifications are possible without deviating from the spirit of the present invention, with the scope of the invention being limited only by the claim language which follows hereafter.

What is claimed is:

1. A microprocessor architecture for realizing efficient Operating System functions, and low power, comprising:

a program instruction memory module (102I), said program instruction memory module having a first external cache and memory module (105I), a first internal cache (110I) a first DMA controller (122I), and a first cache controller and cache bank module (126I), said first external cache and memory module (105I) connecting to said first internal cache (110I) said first internal cache (110I) connecting to said first DMA controller (122I) and said first DMA controller (122I) connecting to said first cache controller and cache bank module (126I);

a data memory module (102D), said data memory module having a second external cache and memory module (105D), a second internal cache (110D), a second DMA controller (122D), and a second cache controller and cache bank module (126D), said second external cache and memory module (105D) connecting to said second internal cache (110D), said second internal cache (110D) connecting to said second DMA controller (122D) and said second DMA controller (122D) connecting to said second cache controller and cache bank module (126D);

a register memory module (102R), said register memory module having a third external cache and memory module (105R), a third internal cache (110R), a third DMA controller (122R), and a third cache controller and cache bank module (126D 126R), said third external cache and memory module (105R) connecting to said third internal cache (110R), said third internal cache (110R) connecting to said third DMA controller (122R) and said third DMA controller (122R) connecting to said third cache controller and cache bank module (126R);

a pipeline state memory module (102P), said pipeline state memory module having a fourth external cache and memory module (105P), a fourth internal cache (110P), a fourth DMA controller (132), and a fourth cache controller and cache bank module (136), said fourth external cache and memory module (105P) connecting to said fourth internal cache (110P), said fourth internal cache (110P) connecting to said fourth DMA controller (132) and said fourth DMA controller (132) connecting to said fourth cache controller and cache bank module (136); and a microprocessor pipeline (190), said microprocessor pipeline connecting to said first cache controller and cache bank module (126I), to said second cache controller and cache bank module (126D), to said third cache controller and cache bank module (126R), and to said fourth cache controller and cache bank module (136); and wherein said first DMA controller (122I) and said first cache controller and cache bank module (126I) communicate with said microprocessor pipeline for executing instructions while said first DMA controller (122I) and said first cache controller and cache bank module (126I) utilize said first internal cache (110I) and first external cache and memory module (105I) for memory storage;

said second DMA controller (122D) and said second cache controller and cache bank module (126D) communicate with said microprocessor pipeline for data operations while said second DMA controller (122D) and said second cache controller and cache bank module (122D) utilize said second internal cache (110D) and second external cache and memory module (105D) for memory storage;

said third DMA controller (122R) and said third cache controller and cache bank module (126R) communicate with said microprocessor pipeline for register operations while said third DMA controller (122R) and said third cache controller and said cache bank module (126R) utilize said third internal cache (110R) and said third external cache and memory module (105R) for memory storage;

said fourth DMA controller (132) and said fourth cache controller and cache bank module (136) communicate with said microprocessor pipeline for pipeline state operations while said fourth DMA controller (132) and said fourth cache controller and cache bank module (136) utilize said fourth internal cache (110P) and fourth external cache and memory module (105P) for memory storage.

2. A microprocessor architecture according to claim 1 wherein:

said first, second, third, and fourth cache controller and cache bank modules (126I, 126D, 126R, 136) contain respective cache banks (250I, 250D, 250R, 350) containing permission fields (610.*m*) for implementing OS information assurance features (650) in hardware, said permission fields (610.*m*) protecting each cache bank (250I.B(m), 250D.B(m), 250R.B(m), 350.B(m)), said cache banks containing a plurality of memory cells, wherein each memory cell contains permission fields (624, 625, 626, 630, 632) implementing information assurance, said permission fields providing protection against malware.

3. A microprocessor architecture according to claim 1 wherein:

said microprocessor architecture (100) allows the microprocessor pipeline (190) to run instructions, while said DMA controllers (122I, 122D, 122R, 132) and said cache controller and cache bank modules (126I, 126D, 126R, 136) handle overhead of a context switch, said microprocessor pipeline, said DMA controllers and said cache controller and cache bank modules all working in parallel.

4. A microprocessor architecture according to claim 2, further comprising a permission bit IRegIO (650E) providing for OS managed input/output control without any OS overhead for protecting said each cache bank and said memory cells from a malicious instruction and poorly coded software.

5. A microprocessor architecture according to claim 1, wherein:

each of said cache bank controllers and cache banks incorporate a permission bit (650D) providing OS level control over jump and branch on an index register instruction for preventing malware from utilizing the jump or branch on the index register to protect areas of memory.

6. A microprocessor architecture according to claim 1, further comprising swapping set cache banks (250I.B(swp), 250D.B(swp), 250R.B(swp) 350.B(swp)) for operating a reduced voltage and clock frequency, and inactive cache banks (250I.B(ina), 250D.B(ina), 250R.B(ina), 350. B(ina)) located within said first, said second, said third and said fourth cache controller and cache bank modules (126I, 126D, 126R, 136).

7. A microprocessor architecture according to claim 1, further comprising:

a table (700) listing all possible library functions and providing access and permission control for software running on the microprocessor architecture.

\* \* \* \* \*